(12) United States Patent
Kohara

(10) Patent No.: US 8,676,450 B2
(45) Date of Patent: Mar. 18, 2014

(54) STEERING WHEEL POSITION CONTROL SYSTEM FOR A VEHICLE

(71) Applicant: DENSO CORPORATION, Kariya (JP)

(72) Inventor: Kenji Kohara, Chiryu (JP)

(73) Assignee: DENSO CORPORATION, Kariya (JP)

(*) Notice: Subject to any disclaimer, the term of this patent is extended or adjusted under 35 U.S.C. 154(b) by 0 days.

(21) Appl. No.: 13/662,776

(22) Filed: Oct. 29, 2012

(65) Prior Publication Data

US 2013/0166154 A1   Jun. 27, 2013

(30) Foreign Application Priority Data

Dec. 26, 2011   (JP) .................................. 2011-283893

(51) Int. Cl.
| | |
|---|---|
| B60Q 1/12 | (2006.01) |
| B60R 21/00 | (2006.01) |
| B60R 21/05 | (2006.01) |
| B62D 15/00 | (2006.01) |
| B62D 15/02 | (2006.01) |

(52) U.S. Cl.
USPC .................... 701/49; 701/41; 701/45; 116/31

(58) Field of Classification Search
CPC .......... B60Q 1/12; B60Q 1/42; B60R 16/027; B60R 16/037; B60R 25/02; B60R 25/02105; B60R 25/2081; B60R 2011/001; B62D 1/11; B62D 1/19; B62D 15/02
USPC ................................... 701/41, 45, 49; 116/31
See application file for complete search history.

(56) References Cited

U.S. PATENT DOCUMENTS

| 6,045,155 | A  | * | 4/2000  | Cech et al. .................... 280/735 |
| 6,782,316 | B2 | * | 8/2004  | Breed et al. ..................... 701/49 |
| 2003/0116362 | A1 | * | 6/2003  | Breed et al. ............... 177/25.13 |
| 2003/0209893 | A1 | * | 11/2003 | Breed et al. ..................... 701/45 |
| 2004/0122574 | A1 | * | 6/2004  | Inman et al. .................... 701/49 |
| 2005/0043877 | A1 | * | 2/2005  | Beneker et al. ................. 701/49 |
| 2005/0125106 | A1 | * | 6/2005  | Beneker et al. .................. 701/1 |
| 2005/0140127 | A1 | * | 6/2005  | Nakajima ..................... 280/731 |
| 2008/0021616 | A1 | * | 1/2008  | Aoki et al. ...................... 701/45 |

(Continued)

FOREIGN PATENT DOCUMENTS

| JP | 5058206 A | 3/1993 |
| JP | H07-069107 A | 3/1995 |

(Continued)

OTHER PUBLICATIONS

Office Action mailed Oct. 22, 2013 in the corresponding JP application No. 2011-283893 (English translation).

*Primary Examiner* — Mary Cheung
*Assistant Examiner* — Atul Trivedi
(74) *Attorney, Agent, or Firm* — Posz Law Group, PLC

(57) ABSTRACT

A steering wheel position control system includes a head position acquisition part for acquiring a position of a head part of a driver, a seat movement detection part for detecting movement of a seat, on which the driver is seated, a steering wheel position calculation part for calculating a position of a steering wheel based on the position of the head part acquired by the head position acquisition part when the movement of the electric power seat is detected by the seat movement detection part, and a steering wheel position change part for moving the steering wheel to the position of the steering wheel calculated by the steering wheel position calculation part.

6 Claims, 2 Drawing Sheets

(56) References Cited

U.S. PATENT DOCUMENTS

| | | | | |
|---|---|---|---|---|
| 2008/0111362 | A1* | 5/2008 | Eriksson | 280/775 |
| 2009/0288305 | A1* | 11/2009 | Tentrup et al. | 33/203.12 |
| 2011/0185839 | A1* | 8/2011 | Inoue | 74/493 |
| 2011/0238266 | A1* | 9/2011 | Plaideau et al. | 701/42 |

FOREIGN PATENT DOCUMENTS

| | | |
|---|---|---|
| JP | H11-255045 A | 9/1999 |
| JP | 2004-291792 A | 10/2004 |
| JP | 2005-313784 A | 11/2005 |
| JP | 2006015872 A | 1/2006 |

* cited by examiner

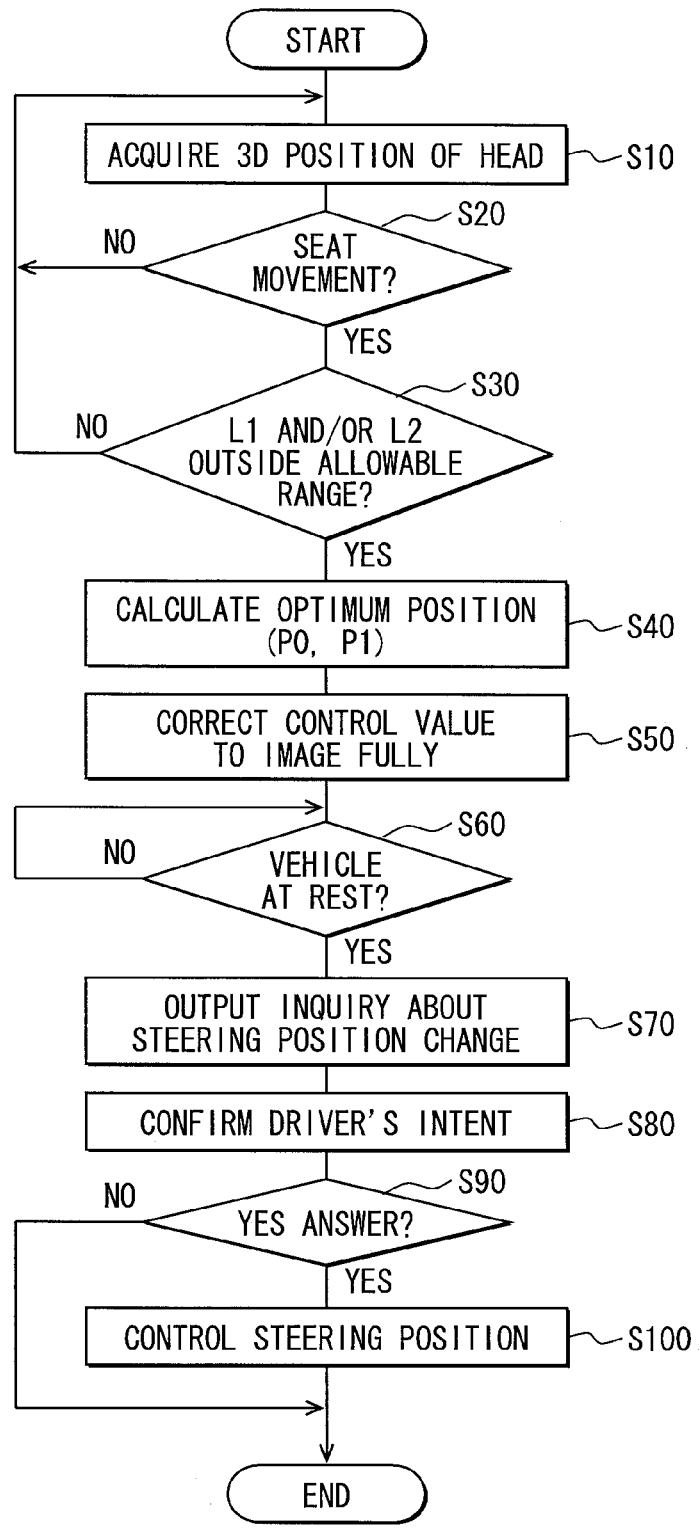

US 8,676,450 B2

STEERING WHEEL POSITION CONTROL SYSTEM FOR A VEHICLE

CROSS REFERENCE TO RELATED APPLICATION

The present application relates to and incorporates herein by reference Japanese patent application No. 2011-283893 filed on Dec. 26, 2011.

TECHNICAL FIELD

The present disclosure relates to a steering wheel position control system for a vehicle.

BACKGROUND ART

JP 2004-291792A discloses a system, which adjusts a position of a steering wheel in correspondence to body information of a driver, which has been detected previously, when a driver operates an automatic wheel position adjustment switch.

When the position of a seat for a driver is moved forward or rearward, a distance between a steering wheel and a base of a driver's arm changes. As a result, the position of the steering wheel often becomes unsuited to the driver, that is, too far from or too close to the driver. If the steering wheel position is adjusted as disclosed in JP 2004-291792, the driver needs to operate the automatic adjustment switch separately from a seat position change operation. Thus complicated operation is required.

SUMMARY

It is therefore an object to provide a steering wheel position control system, which is capable of readily adjusting a position of a steering wheel of a vehicle.

According to a steering wheel position control system is provided for a vehicle having a steering wheel and an electric power seat for a driver. The steering wheel position control system includes a head position acquisition part, a seat movement detection part, a steering wheel position calculation part and a steering wheel position change part. The head position acquisition part acquires a position of a head part of the driver. The seat movement detection part detects movement of the electric power seat. The steering wheel position calculation part calculates a position of the steering wheel based on the position of the head part acquired by the head position acquisition part, when the movement of the electric power seat is detected by the seat movement detection part. The steering wheel position change part moves the steering wheel to the position calculated by the steering wheel position calculation part.

BRIEF DESCRIPTION OF THE DRAWINGS

The above and other objects, features and advantages of a steering wheel control system for a vehicle will become more apparent from the following description made with reference to the accompanying drawings. In the drawings:

FIG. 3 is a flowchart showing control processing executed by the steering wheel position control system.

EMBODIMENT

A steering wheel position control system for a vehicle will be described in detail with reference to one embodiment shown in FIG. 1 to FIG. 3.

Figure 1:
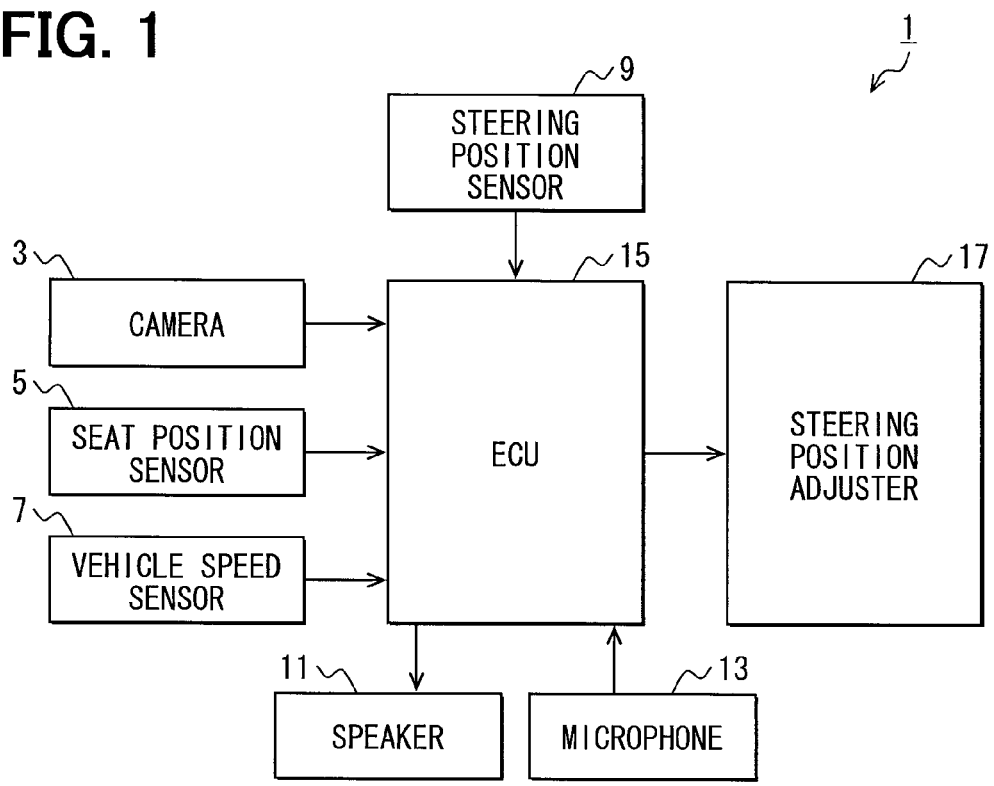
FIG. 1 is a block diagram showing a steering position control system for a vehicle.

The steering wheel position control system for a vehicle, which is an in-vehicle apparatus mounted on a vehicle, is designated by numeral 1 in FIG. 1. The steering wheel position control system 1 includes a camera (head position acquisition part) 3, a seat position sensor (seat movement detection part) 3, a vehicle speed sensor 7, a steering wheel position sensor 9, a speaker 11, a microphone (input part) 13, an ECU (steering wheel position change calculation part, check part) 15 and a steering wheel position adjuster unit (steering wheel position change part) 17.

Figure 2:
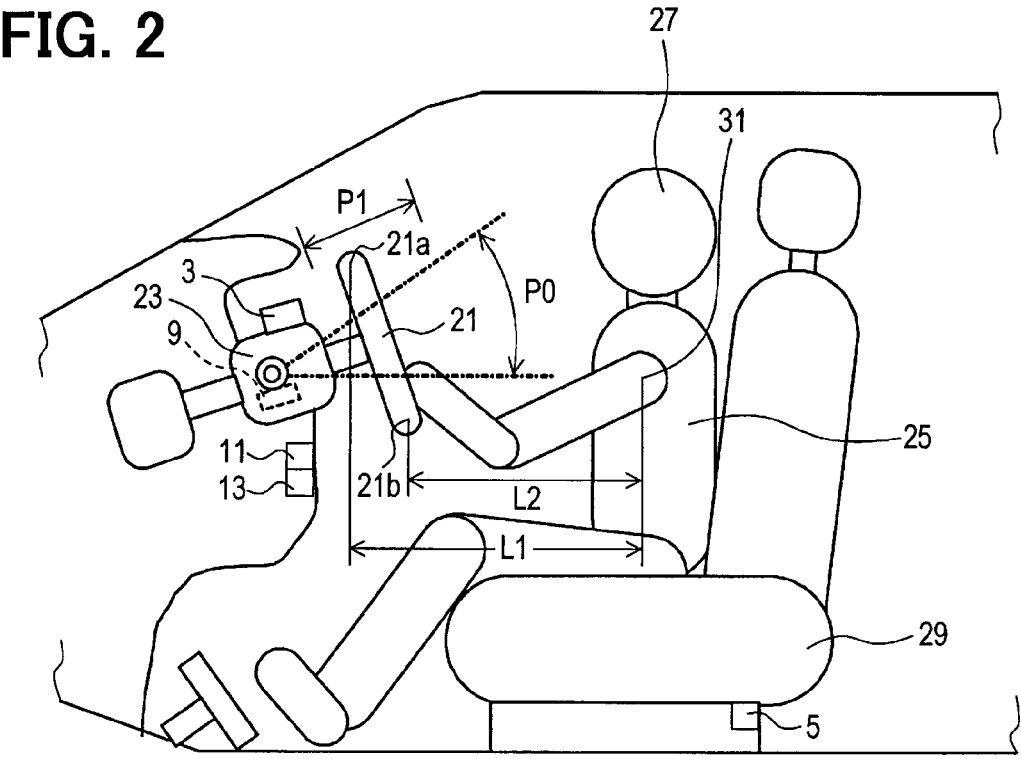
FIG. 2 is a schematic view showing an arrangement of a part of the steering wheel position control system in a vehicle.

As shown in FIG. 2, the camera 3 is attached on a base part 23 of a steering assembly including a steering wheel 21 and a steering column to image an area covering a head part 27 of a driver 25. When a tilt angle P0 of the steering wheel 21 relative to the horizontal plane is changed, the direction of the base part 23 and the camera 3 mounted thereon is also changed.

The seat position sensor 5 is provided to detect a position of an electric power seat (electrically-powered seat) 29 for the driver 25 in a front-rear direction (left-right direction in FIG. 2, that is, vehicle front-rear direction). The electric power seat 29 is movable in the front-rear direction by a predetermined input operation of the driver and stoppable at an arbitrary position within its movable range.

The vehicle speed sensor 7 is provided to detect a travel speed of the vehicle. The vehicle speed sensor 7 also detects that the vehicle is at rest when the detected travel speed is about 0. The steering wheel position sensor 9 is provided to detect a position (tilt angle P0 and telescopic position P1) of the steering wheel 21.

The speaker 11 is provided to output a voice sound in a vehicle compartment. The microphone 13 is provided to pick up voice sound, which the driver generates in the vehicle compartment. The ECU 15 is provided to execute control processing in correspondence to input signals from the camera 3, the seat position sensor 5, the vehicle speed sensor 7, the steering wheel position sensor 9 and the microphone 13, as described later. The ECU 15 has the same or similar hardware configuration as a conventional computer.

The steering wheel position adjuster unit 17 adjusts the position (tilt angle P0 and telescopic position p1) of the steering wheel 21 to the position calculated by the ECU 15 by using a conventional motor-driven actuator.

The ECU 15 is configured to execute steering wheel position control processing shown in FIG. 3, in which S indicates a step. This processing is executed in repetition at every predetermined interval.

The ECU 15 acquires at step 10 an image covering the head part 27 of the driver 25. Then the ECU 15 acquires a three-dimensional (3D) position of the head part 27 (positions in the left-right direction, the up-down direction and front-rear direction, when viewed from the front side of the vehicle) by using conventional image analysis technology. The position in the front-rear direction may be calculated based on a magnitude of interval (distance) between both eyes in the head part 27 or the like. The head part 27 is located at a more front side as the interval between the eyes is larger.

The ECU 15 acquires at step 20 the position of the electric power seat 29 from the seat position sensor 5 and checks whether the position currently acquired is different from the position acquired previously at step 20, that is, whether the electric power seat 29 has been moved by the driver from the time point of previous execution of step 20.

If the electric power seat 29 has been moved, the ECU 15 executes step 30. If not, the ECU 15 executes step 10. The ECU 15 calculates at step 30 following parameters L1 and L2 based on the position of the head part 27 and the position of the steering wheel 21, which are acquired at step 10.

L1: a horizontal distance between a base part 31 of an arm of the driver 25 and an upper or top part 21a of the steering wheel 21

L2: a horizontal distance between the base part 31 of the arm of the driver 25 and a lower or bottom part 21b of the steering wheel 21

The ECU 15 pre-stores therein a data map, which defines relations of outputs L1 and L2 relative to a combination of inputs of the position of the head part 27 and the position of the steering wheel 21, and calculates the L1 and L2 by using the data map.

The ECU 15 checks whether L1 is outside a first allowable range predetermined for L1 and whether L2 is outside a second allowable range predetermined for L2. The ECU 15 thus checks whether L1 and/or L2 are outside the respective predetermined ranges. If any one of L1 and L2 is outside the respective allowable ranges, the ECU 15 executes step 40. If both L1 and L2 are within the respective allowable ranges, the ECU 15 executes step 10. Each of the allowable range for L1 and the allowable range for L2 is defined by an upper limit value and a lower limit value.

The ECU 15 calculates at step 40 an optimum position of the steering wheel 21 based on the position of the head part 27 acquired at step 10. The ECU 15 pre-stores therein a data map, which outputs an optimum position of the steering wheel 21 in response to an input of the position of the head part 27 (position uniquely determined in correspondence to the position of the head part 27), and calculates the optimum position of the steering wheel 21 by using the data map.

The ECU 25 checks at step 50 whether all of the head part 27 is covered within an image area of the camera 3 when the steering wheel 21 is moved to the position calculated at step 40. If all the head part 27 is covered, the optimum position of the steering wheel 27 calculated at step 40 is not corrected. If even a part of the head part 27 is not covered within the image area of the camera 3, the optimum position of the steering wheel 21 calculated at step 40 is corrected so that the head part 27 may be fully imaged by the camera. Specifically, as far as the head part 27 is fully covered within the imaging area of the camera 3, a position, which is close as much as possible to the position calculated at step 40, is set as a position after correction.

Whether all of the head part 27 is covered within the imaging area of the camera 3 is determined by the position of the head part 27 and the position of the steering wheel 21. The ECU 15 pre-stores therein a data map, which outputs a determination result about whether all the head part 27 is covered within the imaging area of the camera 3 in response to an input of the position of the head part 27 and the position of the steering wheel 21, and executes the above-described check step by using the data map.

The ECU 15 checks at step 60 whether the vehicle speed is 0 (vehicle is at rest) based on the output of the vehicle speed sensor 7. If the vehicle speed is 0, the ECU 15 executes step 70. If the vehicle speed is not 0, the ECU 15 repeats step 60.

The ECU 15 drives the speaker 11 at step 70 to output a voice sound, which inquires whether the steering wheel position should be adjusted or changed. The ECU 15 confirms at step 80 a voice sound, which is generated in the vehicle compartment and indicates the driver's intent. The voice sound is picked up by the microphone for a predetermined period after the voice sound of the inquiry has been outputted at step 70.

The ECU 15 checks at step 90 whether the voice sound generated by the driver indicates that the steering wheel position should be changed. In this check step, conventional voice analysis technology may be used. When the voice sound indicating the need of change of the steering wheel position is detected, the ECU 15 executes step 100. If not, the ECU 15 finishes the above-described processing.

At step 100, the ECU 15 drives the steering wheel 21 to the position determined at step 50 by way of the steering wheel position adjuster unit 17.

The steering wheel position control system 1 described above provides the following advantages.

(1) When the electric power seat 29 is moved, the position of the steering wheel 21 can be moved to the optimum wheel position without direct adjustment of the position of the steering wheel 21 by the driver. It is thus possible to eliminate strangeness about the position of the steering wheel 21, which is otherwise caused by the movement of the electric power seat 29.

(2) The position of the steering wheel 21 is changed only when the vehicle is about 0, that is, not in motion. It is thus prevented that driving operation is adversely affected by the change in the position of the steering wheel 21.

(3) The position of the steering wheel 21 is changed only when the driver expressly indicated his/her intention of changing the steering wheel position. It is thus prevented that the position of the steering wheel 21 is changed against the intention of the driver 25.

(4) In the steering wheel position control system 1, the head part 27 is always covered within the image area of the camera 3. It is thus possible to accurately acquire the position of the head part 27.

(5) In the steering wheel position control system 1, the position of the steering wheel 21 is changed only when at least one of L1 and L2 becomes outside the allowable range. It is thus prevented that the position of the steering wheel 21 is changed even in a case that the position change of the steering wheel 21 is unnecessary (for example, the movement of the electric power seat 29 is small and hence the driver 25 does not feel strangeness about the position of the steering wheel 21).

The above-described system control system is not limited to the disclosed embodiments but may be implemented in other various modes.

For example, step 70 may be executed immediately following step 50 (step 60 may be removed).

Step 100 may be executed immediately following step 70 (steps 80 and 90 may be removed).

Step 40 may be executed immediately following a YES determination at step 20 (step 30 may be removed).

Step 70 may be modified to display characters on an image display unit thereby to inquire whether the steering wheel position should be changed.

Step 80 may be modified to indicate the intent of changing the position of the steering wheel 21 by checking an input of the driver 25 on a switch (not shown).

What is claimed is:

1. A steering wheel position control system for a vehicle having a steering wheel and an electric power seat for a driver, the steering wheel position control system comprising:

a head position acquisition part for acquiring a position of a head part of the driver, the head position acquisition part includes a camera mounted on a part of a steering device including the steering wheel for imaging the head part of the driver;

a seat movement detection part for detecting movement of the electric power seat;

a steering wheel position calculation part for calculating a position of the steering wheel based on the position of the head part acquired by the head position acquisition part, when the movement of the electric power seat is detected by the seat movement detection part;

a steering wheel position change part for moving the steering wheel to the position calculated by the steering wheel position calculation part; and a check part for checking whether a combination of the position of the head part acquired by the head position acquisition part and the position of the steering wheel is within a predetermined allowable range, wherein the steering wheel position calculation part calculates, based on an image taken by the camera, the position of the steering wheel as a distance from a base of an arm of the driver to the steering wheel; and the steering wheel position change part changes the steering wheel position only when the combination is determined to be outside the predetermined allowable range.

2. The steering wheel position control system according to claim 1, wherein:

the steering wheel position change part moves the steering wheel only when the vehicle is at rest.

3. The steering wheel position control system according to claim 1, further comprising:

an input part for receiving an input of the driver indicative of an intention of the driver, wherein the steering wheel position change part moves the steering wheel on condition that a predetermined operation is inputted to the input part.

4. The steering wheel position control system according to claim 1, wherein:

the head position acquisition part acquires a three-dimensional position of the head part of the driver.

5. The steering wheel position control system according to claim 1, wherein:

the check part checks the combination of the position of the head part and the position of the steering wheel with respect to a top part and a bottom part of the steering wheel; and the steering wheel position change part changes the steering wheel position when the combination is determined to be outside the predetermined allowable range with respect to at least one of the top part and the bottom part.

6. The steering wheel position control system according to claim 1, wherein:

the check part checks the combination of the position of the head part and the position of the steering wheel with respect to a top part and a bottom part of the steering wheel; and the steering wheel position change part changes the steering wheel position only when both the movement of the electric power seat is detected by the seat movement detection part, and the combination is determined to be outside the predetermined allowable range with respect to at least one of the top part and the bottom part.

* * * * *